United States Patent
Yilmaz (10) Patent No.: US 11,535,169 B2
(45) Date of Patent: Dec. 27, 2022

(54) RECEIVING SYSTEM FOR RECEIVING AT LEAST ONE GUIDED DEVICE, AND AN ELECTRIC MODULE, AS WELL AS A MOTOR VEHICLE

(71) Applicant: Volkswagen Aktiengesellschaft, Wolfsburg (DE)

(72) Inventor: Zafer Yilmaz, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 416 days.

(21) Appl. No.: 16/847,136

(22) Filed: Apr. 13, 2020

(65) Prior Publication Data
US 2020/0324712 A1 Oct. 15, 2020

(30) Foreign Application Priority Data

Apr. 12, 2019 (DE) ...................... 10 2019 205 344.0

(51) Int. Cl.
*B60R 11/02* (2006.01)
*B60R 11/00* (2006.01)

(52) U.S. Cl.
CPC .......... *B60R 11/02* (2013.01); *B60K 2370/81* (2019.05); *B60R 11/0205* (2013.01);
(Continued)

(58) Field of Classification Search
CPC .... B60K 2370/81; B60K 37/02; B60K 37/04; G01D 11/305; G12B 9/00; B60R 2011/0005; B60R 11/0205; B60R 11/02
(Continued)

(56) References Cited

U.S. PATENT DOCUMENTS

| 4,368,866 A | * | 1/1983 | Urban ..................... B60R 11/02 |
| | | | 248/286.1 |
| 4,640,542 A | * | 2/1987 | Watjer ................ B60R 11/0241 |
| | | | 312/223.4 |

(Continued)

FOREIGN PATENT DOCUMENTS

| CN | 107444287 A | * | 12/2017 |
| DE | 102004006408 A1 | | 8/2005 |

(Continued)

OTHER PUBLICATIONS

"Wikipedia Autoradio" https://en.wikipedia.org/wiki/Vehicle_audio.
"digitalradio-test.info" https://digitalradio-test.info/.

*Primary Examiner* — Justin M Larson
(74) *Attorney, Agent, or Firm* — Muncy, Geissler, Olds & Lowe, P.C.

(57) ABSTRACT

A receiving system for receiving at least one guided device, in particular an electric unit, in an instrument mount of a motor vehicle. The invention also relates to an electric module, which comprises a receiving system and a guided device, as well as a motor vehicle, which includes a receiving system or an electric module. The receiving system includes a receiving unit for spatially receiving the guided device in the receiving system, as well as a guide for implementing a guided slide-in movement of the guided device, in particular the electric unit, into the receiving unit. The guide is fixed in relation to the receiving unit and defines a nonlinear movement path, so that the guided device may be oriented in a first spatial orientation on an outside of the receiving system facing a driver of a motor vehicle.

11 Claims, 6 Drawing Sheets

(52) U.S. Cl.
CPC . *B60R 2011/005* (2013.01); *B60R 2011/0005* (2013.01); *B60R 2011/0042* (2013.01); *B60R 2011/0075* (2013.01)

(58) Field of Classification Search
USPC ........................................................ 248/27.1
See application file for complete search history.

(56) References Cited

U.S. PATENT DOCUMENTS

| | | | | |
|---|---|---|---|---|
| 4,993,668 | A * | 2/1991 | Inamura | B60R 11/0205 |
| | | | | 248/27.3 |
| 5,169,097 | A * | 12/1992 | Yasukawa | B60K 37/04 |
| | | | | 312/7.1 |
| 5,213,401 | A * | 5/1993 | Hatcher | A47B 21/0314 |
| | | | | 361/679.08 |
| 7,090,316 | B2 * | 8/2006 | Model | A47B 88/60 |
| | | | | 312/328 |
| 7,140,703 | B1 * | 11/2006 | Holdgate, III | A47B 88/48 |
| | | | | 312/330.1 |
| 7,165,798 | B2 * | 1/2007 | Chamberlain | B60R 11/0211 |
| | | | | 296/37.1 |
| 7,398,947 | B2 * | 7/2008 | Bartrom | B60R 11/0211 |
| | | | | 455/345 |
| 7,926,861 | B2 * | 4/2011 | Merlo | B60R 7/06 |
| | | | | 224/483 |
| 8,393,663 | B2 * | 3/2013 | Gayon | B60R 7/06 |
| | | | | 312/246 |
| 9,738,235 | B2 * | 8/2017 | Perveyrie | B60R 11/0205 |
| 10,376,057 | B2 * | 8/2019 | Knake | E05B 65/44 |
| 2003/0160135 | A1 * | 8/2003 | Park | B60R 11/0264 |
| 2005/0139731 | A1 * | 6/2005 | Park | G11B 33/027 |
| 2020/0324712 | A1 * | 10/2020 | Yilmaz | B60K 37/04 |
| 2022/0097618 | A1 * | 3/2022 | Rhyne | B60K 37/04 |

FOREIGN PATENT DOCUMENTS

| | | | | |
|---|---|---|---|---|
| DE | 102008032623 A1 * | 1/2010 | | B60R 11/02 |
| DE | 102014105785 A1 | 11/2014 | | |
| EP | 1184226 A2 | 3/2002 | | |
| EP | 1972498 A2 | 9/2008 | | |

* cited by examiner

RECEIVING SYSTEM FOR RECEIVING AT LEAST ONE GUIDED DEVICE, AND AN ELECTRIC MODULE, AS WELL AS A MOTOR VEHICLE

This nonprovisional application claims priority under 35 U.S.C. § 119(a) to German Patent Application No. 10 2019 205 344.0, which was filed in Germany on Apr. 12, 2019, and which is herein incorporated by reference.

BACKGROUND OF THE INVENTION

Field of the Invention

The present invention relates to a receiving system for receiving at least one guided device, in particular an electric unit, in an instrument mount of a motor vehicle. The invention also relates to an electric module, which comprises a receiving system and a guided device, as well as a motor vehicle, which includes a receiving system or an electric module.

Description of the Background Art

Modern motor vehicles already have a large number of functions that are controlled electronically. This trend continues to grow. When arranging electric and electronic equipment, the goal is always to make the most efficient use of the limited installation space in the vehicle.

One common method for arranging control units is to place them in the installation space behind a glove compartment. However, this generally goes hand in hand with a reduced storage space in the glove compartment, which is disadvantageous from the user's perspective. Consequently, there is the goal of arranging electric units in such a way that vehicle installation space may preferably be used, which is not able to be used as storage space for the vehicle user.

EP 1 972 498 B1, which corresponds to U.S. Pat. No. 7,926,861, shows a module for a drawer of an instrument panel of a motor vehicle for receiving different items or objects, which comprises a container having a closable access opening, a door element being movable by means of hinge elements. In a special embodiment of the module illustrated in EP 1 972 498 B1, the module is configured to arrange a laptop in a motor vehicle in such a way that it may be easily provided for use.

Accordingly, devices are primarily known from the prior art which permit the arrangement of an electric unit in a bay in an instrument panel. However, these designs do not permit or do not easily permit a multiple arrangement of electric units in this spatial area.

SUMMARY OF THE INVENTION

It is therefore an object of the present invention to provide a receiving system as well as an electric module and a motor vehicle equipped therewith, which permit a space-efficient arrangement of at least one electric unit in an instrument mount of the motor vehicle.

A first aspect of the invention is a receiving system for receiving at least one guided device, in particular an electric unit, in an instrument mount of a motor vehicle, in particular a passenger car. The receiving system includes a receiving unit for spatially receiving the guided device in the receiving system, as well as a guide for implementing a guided slide-in movement of the guided device, in particular the electric unit, into the receiving unit. The guide is also fixed in relation to the receiving unit and, as a whole, defines a nonlinear movement path, so that the guided device may be oriented in a first spatial orientation on an outside of the receiving system facing a driver of a motor vehicle equipped with the receiving system during a movement along the guide at the beginning of the slide-in movement through the slide-in opening. After executing the slide-in movement when the guided device is in a position at a distance from the outside, the guided device may be oriented in the receiving unit in a second spatial orientation, which is different from the first spatial orientation.

The guided device can be positioned in the distant position outside a plane in which the slide-in opening is located.

The guided device can be, for example, an electric unit. It may be, for example, an electronic control unit of a motor vehicle, for example a central processor.

The receiving unit is used to spatially arrange the guided device in a position at a distance in relation to the outside of the receiving system, which faces a driver of a motor vehicle equipped with the receiving system according to the invention, and which has a slide-in opening. The guided device is movable through the slide-in opening toward the front of the vehicle when the slide-in movement is executed. The guided device may thus be arranged in the installation space behind the outside of the receiving system.

Within the meaning of the invention, a distant position can be understood to mean that the guided device is movable through the slide-in opening far enough that, upon reaching the end position of the guide path, the device is arranged entirely behind the plane in which the slide-in opening is located. In other words, the slide-in opening is fully released when the guided device is oriented in the second spatial orientation and has reached its end position.

The guided device is advantageously placed at a sufficient distance from the outside of the receiving system that the installation space located behind the outside of the receiving system is usable for positioning further devices, in particular electric units, in the receiving system.

The receiving unit may be designed as a housing for receiving a guided device designed, in particular, as a piece of electronic equipment, which is fixedly arranged or arrangeable in relation to the instrument mount of a motor vehicle.

The guide is arranged in a fixed spatial relation to the receiving unit, so that the guided device may be arranged in the receiving unit by means of the guided slide-in movement implemented by the guide. Art the end of the slide-in movement, the guided device takes up a defined end position in the receiving unit. The guiding of the receiving system according to the invention as a whole defines a nonlinear movement path, on which the guided device may be guided. In other words, the slide-in movement describes a course with at least one change of direction. This makes it possible to orient the guided device in a first spatial orientation in relation to the outside of the receiving system at the beginning of the slide-in operation and to change its spatial orientation during the course of the slide-in operation, namely upon reaching a direction-changing section of the guide and to thus be arranged in a position at a distance from the outside of the receiving position in the receiving unit in a second spatial orientation. In other words, due to the nonlinear movement path of the guide, a rotation or a pivoting of the guided device around an axis is implemented, which runs perpendicularly to the plane of the movement direction.

The direction-changing section of the guide is advantageously already located at a sufficient distance from the outside of the receiving system that the guided device has been inserted sufficiently far into the receiving unit at this point in the slide-in movement that the guided device is situated entirely behind the outside of the receiving system in the direction toward the front of the vehicle no later than after the completion of the change in direction, and it does not necessarily have to have reached its end position at this point, so that the slide-in movement does not yet have to be concluded. This is advantageous, in particular, if the receiving system has a slide-in opening, through which the guided device must be passed, which is delimited by a wall.

It is correspondingly provided that, due to the nonlinear movement path of the guide, the guided device may be inserted into a cavity or an opening in the instrument mount and placed into a position which is rotated with respect to the orientation at the beginning of the slide-in movement, and in which the guided device is fixable, upon reaching a relatively great distance from the outside.

The advantage of the receiving system according to the invention is that a guided device, in particular an electric unit, such as a central processor, may be positioned in an instrument mount in a space-efficient manner.

In an exemplary embodiment of the receiving system according to the invention, the guide is configured to implement a guided slide-in movement essentially in a plane perpendicular to the outside of the receiving system.

In relation to the outside of the receiving system, in particular in relation to the plane of the slide-in opening, the guide is arranged in such a way that the plane in which the slide-in movement is executed is oriented perpendicularly to the outside of the receiving system, so that the guided device may be inserted from the outside of the receiving system into the installation space situated toward the front of the vehicle and thus into the instrument mount or into a space reserved for the instrument mount, due to the slide-in movement.

In particular, the plane in which the slide-in movement is executed is in parallel to the plane, which is defined by the vehicle longitudinal axis, which is also typically referred to as the x axis in vehicle manufacturing, and which corresponds to the slide-in direction of the guided device toward the front of the vehicle and defines the vehicle vertical axis, which is also typically referred to as the z axis in vehicle manufacturing.

Due to this design of the receiving system according to the invention, an arrangement of the guided device, in particular the electric unit, may be implemented in the installation space situated toward the front of the vehicle.

The receiving system can comprise a support structure, the receiving unit being mechanically fixedly connectable or connected to the support structure.

The support structure may be, for example, a cross member of a motor vehicle. The receiving unit is mechanically connected or connectable to the support structure. Accordingly, the receiving unit and the support structure are configured to establish a form-fitting and/or force-fitting connection. The receiving system according to the invention comprises corresponding connectors for this purpose.

The support structure is not necessarily configured exclusively to mechanically connect the receiving unit, but may furthermore be used to fix additional vehicle components.

The support structure is used to absorb the weight force of the guided device, in particular the electric unit.

Moreover, it may also be provided that the support structure itself forms the receiving unit, so that the guided device is part of the support structure or is arranged directly on the support structure.

The guide can comprise two essentially linearly running guide sections arranged at angle in relation to each other.

A first linear guide section is namely arranged closer to the outside of the receiving system and is used to implement the beginning of the guided slide-in movement, while the second linear guide section is used to implement the end range of the guided slide-in movement up to reaching the end position of the guided device. A connecting area may be formed between the first guide section and the second guide section.

The slide-in movement correspondingly can also comprises a first linear slide-in movement and a second linear slide-in movement as well as a direction-changing rotational or pivoting movement between the two slide-in movements.

At least one of the two guide sections can have an extension direction with two direction components in a Cartesian coordinate system.

The first linear guide section can have a direction component toward the bottom of the vehicle and an orientation component toward the front of the vehicle, whereby a first linear slide-in movement runs downward an angle in a proper arrangement of the receiving system in a vehicle. The second guide section has a direction component toward the top of the vehicle and a direction component toward the front of the vehicle, whereby a second linear slide-in movement runs upward at an angle. In principle, other embodiments are also possible, for example in the form that the orientation component toward the bottom of the vehicle of the first linear guide section or the direction component toward the top of the vehicle of the second linear guide section is omitted.

The angle formed by the two guide sections can be advantageously within a value range between 90° and 160°.

The advantage of this design lies in the implementation of a slide-in movement for a guided device on a movement path that is sharply bent or bent in sections, so that the guided device may be arranged in a spatial position in which an electric unit is not usually installed.

The guide can comprise at least one rail on each of two opposite sides of the guided device as well as at least one roll. The roll is designed to roll on the rail and consequently to permit a mechanically guided movement of the guided device, in particular the electric unit, along the movement path.

The guide can be arranged on the two opposite sides of the guided device, which extend in a plane essentially in parallel to the plane of the slide-in movement.

A rail can have at least one surface or edge, which is configured to allow an element to move thereon on a defined path by mechanical contact, for example in a sliding or rolling manner.

In particular, the guide may be designed in such a way that a movement transverse to the plane of the slide-in movement is blocked.

The rails can be arranged on the support structure and/or the receiving unit, and the rolls are arranged on the guided device.

The receiving unit may be mechanically connected to a rail. It is also possible that the receiving unit forms the rail, in particular in a design as a housing, and the receiving unit and guide thus represent a structural unit. Alternatively, the rails may be connected to the support structure or be formed thereby.

A design is also possible, in which the rails are arranged on the guided device and the rolls are correspondingly arranged on the support structure and/or the receiving unit.

The advantage of this embodiment lies in a guided and thus secure slide-in movement during the insertion of the guided unit into the receiving unit.

A shaft formed by the receiving system can have a push-through opening on its side facing away from the outside of the receiving system for the purpose of arranging the guided device, in particular the electric unit, in areas outside the space delimited by the shaft.

The shaft may be at least partially formed by the receiving unit, in particular if the receiving unit is designed as a housing for receiving a guided device designed, in particular, as an electric unit. Alternatively, the shaft may be formed by sections of the instrument mount. A shaft of this type is not necessary delimited by walls on all its sides but may also be defined as ideal space by sectional boundaries.

The shaft may be completely open on its side facing away from or essentially opposite the outside of the receiving system, or it may form a push-through opening in areas. In particular, the push-through opening is open in the direction along the second linear slide-in movement.

The shaft may be formed by wall sections of the receiving unit. It is possible that the shaft is designed in such a way that, in addition to the guide, it limits the slide-in movement of the electric unit at least on sections of the slide-in movement. For this purpose, wall sections of the receiving unit may be designed and arranged in such a way that they form contact surfaces for the guided device during the slide-in movement. Depending on the design of the guide, this may support a secure insertion of the guided device, among other things in the area of the change in direction of the slide-in movement.

At least on the side of the shaft facing the passenger compartment, the shaft has an outer boundary due to shaft walls, which are arranged and dimensioned in such a way that they are compatible with an opening of the instrument mount abutting the outside of the receiving system, so that a minimum distance exists between the inner wall of the opening and the shaft walls.

In addition, the shaft is compatible with the guided device, at least with respect to its width, i.e. its extension transverse to the slide-in movement, shape and size, in particular if the guided device is designed as an electric unit.

The shaft can comprise two shaft sections, the first shaft section being essentially assigned to the first guide section, and the second shaft section being essentially assigned to the second guide section.

A design of the receiving system according to the invention with a push-through opening makes it possible to insert the guided device past the shaft formed by the receiving system and into the installation space toward the front of the vehicle and to efficiently use additional installation space.

A second aspect of the invention relates to an electric module, which comprises a receiving system according to the invention as well as at least one guided device arranged in the receiving unit and designed as an electric unit.

A unit, which may be arranged in a space-efficient manner is thus made available for installing, for example, a central processor for a motor vehicle.

The guided device can be designed as an electric unit is fixed in the receiving unit, in particular by means of an engagement.

The fixing between the receiving unit and the electric unit advantageously takes place by means of an engagement. The advantage of an engaging connection is that a concealed installation and fixing at a greater distance from the accessible side, which corresponds to a side facing a driver of a motor vehicle equipped with the receiving system according to the invention, may be safely implemented, in particular in connection with a guided slide-in movement of the guided device.

The guided device can be fixedly arranged by the fixing with respect to its position in relation to the instrument mount. The position-fixed arrangement is necessary, among other things, to ensure secure electric and data connections between an electric unit and the devices connected or connectable to the electric unit.

At least one second electric unit can be arranged at or in the receiving system in such a way that one side of the second electric unit is essentially arranged in the plane of the outside of the receiving system.

In particular, one side of the second electric unit is arranged in the slide-in opening, so that the slide-in opening is at least fully or partially covered by this side of the second electric unit. In the case of an only partial coverage, the electric module preferably additionally comprises a cover for covering the rest of the slide-in opening.

The second electric unit may be, for example, another control unit for controlling electric vehicle devices and/or an operating element for inputting and outputting information for the driver.

In this example, the receiving system advantageously additionally comprises a fixing device, which is provided and configured to fix the second electric unit.

The guide may be at least partially used for arranging the second electric unit. Alternatively or additionally, a second guide and/or positioning device may be provided for the purpose of positioning the second electric unit. This is advantageous, in particular if the second electric unit may be thereby arranged in combination with the guided device in a space-efficient manner with respect to its dimensions.

In a design of the electric module with a second electric unit and a guided device, which are both arranged in the receiving unit, the second shaft section is advantageously compatible with the cross-section of the guided device in terms of its cross-section, shape and size. The first shaft section, however, advantageously has a larger cross-section, in particular twice as large. This makes it easier to install the guided device in a curved or angled slide-in movement along the guide.

In addition, it makes it easier to arrange a second electric unit in the shaft.

A module is thus provided, which comprises not only a guided device but also at least one second electric unit.

A further aspect of the invention is a motor vehicle, in particular a passenger car, which comprises a receiving system according to the invention or an electric module according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
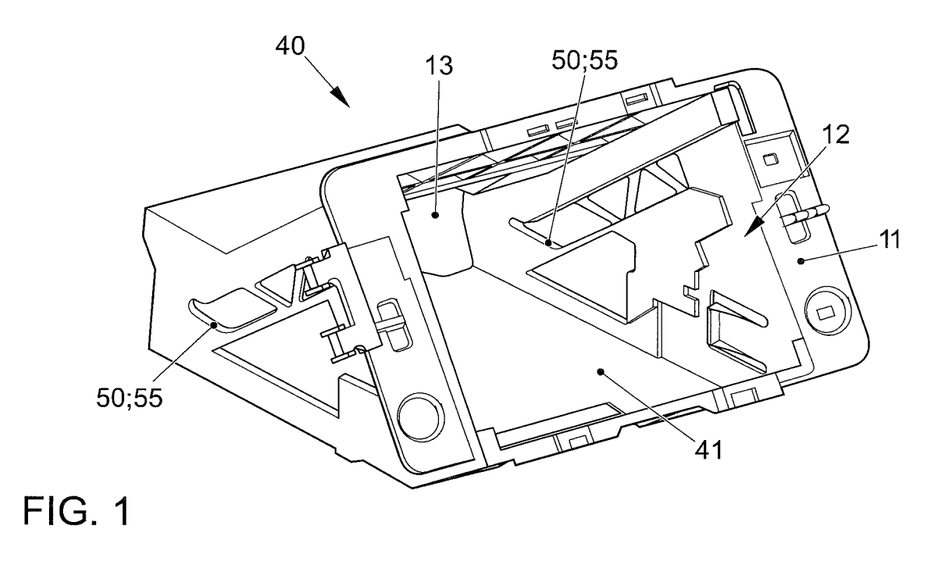
FIG. 1 shows a receiving device of the receiving system according to the invention in a three-dimensional view.

FIG. 1 shows a receiving unit 40 of the receiving system according to the invention in a three-dimensional view. Outside 11 of the receiving unit faces the vehicle interior in the proper arrangement of the receiving system in a vehicle. In this embodiment, receiving unit 40 is designed as a housing and forms a shaft 41, whose walls have recesses or openings. A slide-in opening 12 is situated in the plane of outside 11 of the receiving system. Receiving unit 40 forms a push-through opening 13 on the side essentially opposite slide-in opening 12. Receiving unit 40 is designed in such a way that guided devices, which are electric units in the exemplary embodiments shown below, may be inserted through slide-in opening 12 into receiving unit 40 or arranged at slide-in opening 12. An electric unit is movable within shaft 41 on a nonlinear movement path in the direction toward the front of the vehicle by means of guide 50, which, in the illustrated design, comprises two rails 55. It is apparent that guide 50 forms an angle to implement the nonlinear movement path. Depending on the shape and size of the electric unit, the latter may be moved through push-through opening 13 and thus be arranged at least partially outside the space delimited by shaft 41.

Figure 2:
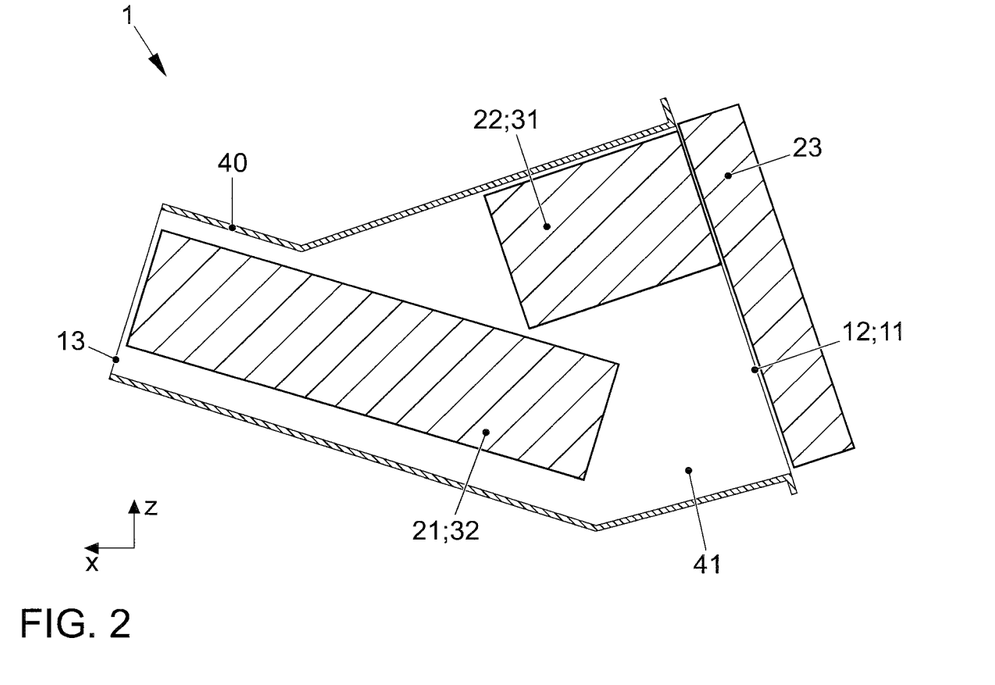
FIG. 2 shows an electric module according to the invention, including three arranged electric units in a sectional view in the x-z plane.

FIG. 2 shows an embodiment of electric module 1 according to the invention, including three electric units 21, 22, 23 arranged in or at receiving unit 40, in a sectional view in the x-z plane. In this embodiment as well, receiving unit 40 designed as a housing forms a shaft 41 having a push-through opening 13, which is at least partially open toward the front of the vehicle when properly arranged in a vehicle. First electric unit 21, which is inserted through slide-in opening 12 in a first installation step when installing electric module 1, is arranged in second spatial orientation 32 within receiving unit 40. First electric unit 21 is, for example, a central processor of a motor vehicle equipped with the receiving system according to the invention. It is apparent that it would be possible, in principle, to push this first electric unit 21 through push-through opening 13 farther in the x-z direction and thus free up additional installation space in shaft 41.

A second unit 22 is arranged in a first spatial orientation 31 in the remaining installation space in such a way that it is situated with one of its sides, namely the side facing the vehicle interior, in the plane of slide-in opening 12. Second electric unit 22 is, for example, another central processor of a vehicle to be equipped with electric module 1 according to the invention. The remaining installation space in shaft 41 may be used to receive additional pieces of equipment, used for a cable conduit and/or remain free for the purpose of ensuring adequate ventilation and/or cooling of the arranged units.

In the design illustrated here, a third electric unit 23 is further arranged on outside 11 of the receiving system in such a way that it is also situated essentially in slide-in opening 12 with its side facing away from the vehicle interior. Third electric unit 23 is typically an operating unit, which enables the driver to control different vehicle functions. Alternatively, however, a cover may be mounted instead of third piece of equipment 23, which closes the receiving system toward the vehicle interior.

Figure 3:
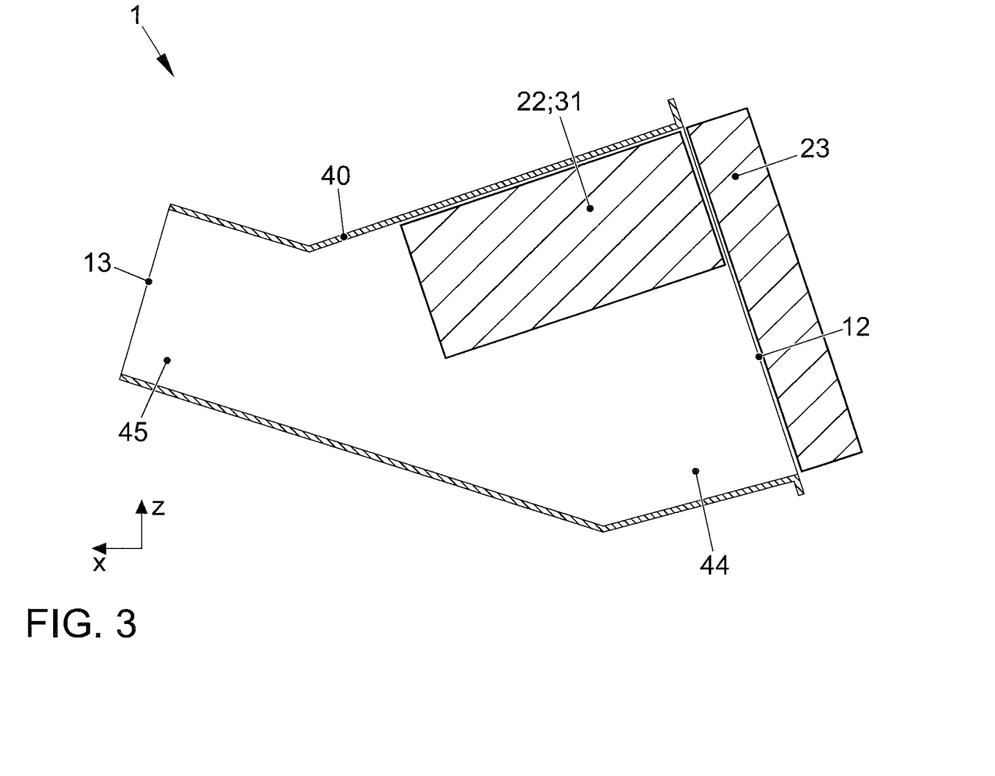
FIG. 3 shows an electric module according to the invention, including two electric units arranged in or at the receiving unit, in a sectional view in the x-z plane.

FIG. 3 shows an embodiment of electric module 1 according to the invention, in which only second electric unit 22 is arranged in first spatial orientation 31, and third electric unit 23 is arranged on outside 11 of the receiving system. This also shows that shaft 41 formed by receiving unit 40 includes two shaft sections 44, 45, the cross-section of first shaft section 44 being larger in the plane in parallel to slide-in opening 12 that the cross-section of second shaft section 45 in the plane in parallel to push-through opening 13. Accordingly, slide-in opening 12 is larger than push-through opening 13. This applies, in particular to the height dimensions thereof. This design is advantageous with respect to the installation of first electric unit 21 and its guidance on a nonlinear movement path.

Figure 4:
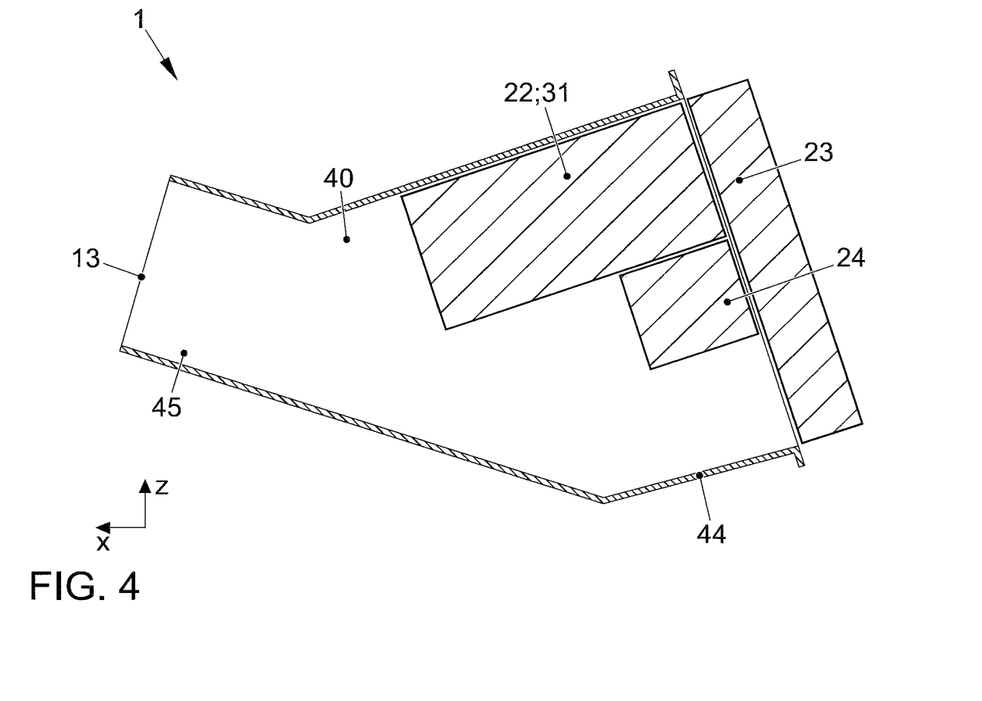
FIG. 4 shows an electric module according to the invention, including three electric units arranged in or at the receiving unit, in a sectional view in the x-z plane.

FIG. 4 shows how another, fourth electric unit 24 in receiving unit 40 may be arranged in first shaft section 44 in parallel to second electric unit 22 in first spatial orientation 31, based on another exemplary embodiment of electric module 1 according to the invention. A third electric unit 23 is also arranged in this case, as illustrated in FIGS. 2 and 3.

Figure 5:
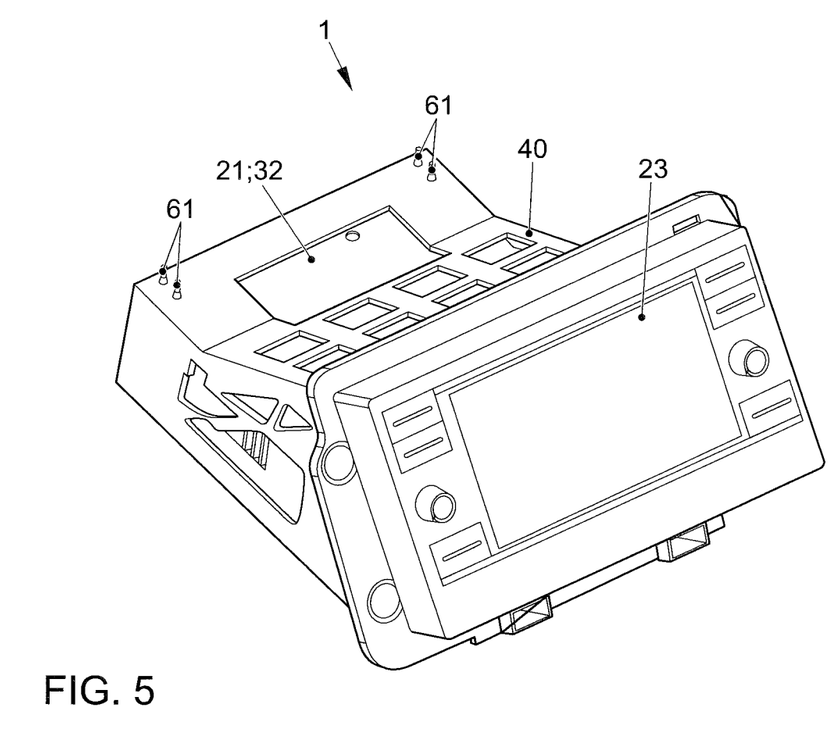
FIG. 5 shows a three-dimensional view of the receiving unit of the electric module according to the invention, including two electric units arranged in or at the receiving unit.

FIG. 5 shows a design in a three-dimensional view from the outside, which essentially corresponds to the arrangement from FIG. 2. First electric unit 21 is arranged in receiving unit 40 in second spatial orientation 32. Third electric unit 23, which is designed in this case as an operating unit, is arranged on the side facing the vehicle interior. Based on the view, a second electric unit 22 is not apparent. First electric unit 21 is engaged with receiving unit 40 by means of engaging elements 61. It is apparent that receiving unit 40 has material recesses or openings. These are advantageous, among other things, with respect to the ventilation and/or cooling of electric decides 21, 22, 23.

Figure 6:
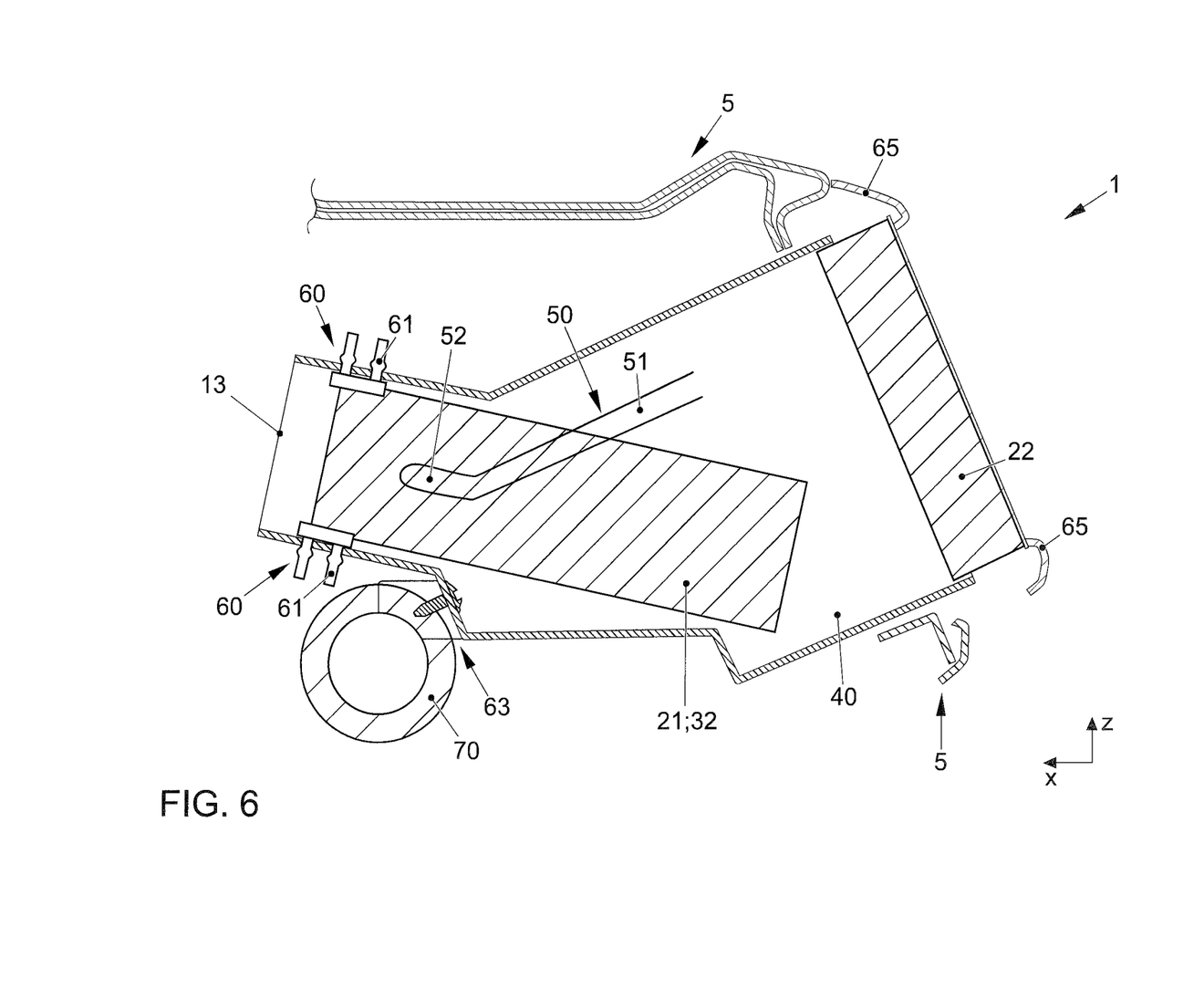
FIG. 6 shows an arrangement of the electric module according to the invention in an instrument mount.

FIG. 6 shows a sectional view of the arrangement of electric module 1 according to the invention in an instrument mount 5 of a motor vehicle in the x-y plane. Receiving unit 40 is equipped with a first electric unit 21 in second spatial orientation 32. It is apparent that first electric unit 21 is connected to receiving unit 40 by an engagement 60 with the aid of engaging elements 61. It is also apparent that receiving unit 40 is connected to a support structure 70 by means of a connecting device 63. In the illustrated example, support structure 70 is at least partially formed by a support tube, which extends in the y direction and thus transversely to the vehicle longitudinal axis. Electric module 1 according to the invention is fixed in instrument mount 5 by means of indicated fixing devices 65.

The arrangement and orientation of guide 50 with respect to receiving unit 40 is shown in the representation in FIG. 6. It is apparent that guide 50 is formed by two essentially linear guide sections 51, 52, which are arranged at an angle to each other. In the illustrated example, first guide section 51, which is used primarily to move first electric unit 21 through first shaft section 44 of shaft 40, is designed to be significantly longer than second guide section 52, which is used primarily to move first electric unit 21 through second shaft section 45 of shaft 40. However, this design is in no way obligatory. It results from the structural interaction between the dimensions of first electric unit 21, the design of receiving unit 40 and/or the desired end position of first electric unit 21 with respect to push-through opening 13. In this example, guide 50 is also provided with a continuous design, which also does not have to be obligatory. An interruption of guide rail 55 between first guide section 51 and section guide section 52 is likewise possible.

In the embodiment illustrated here, including a receiving unit 40 designed as a housing, the latter is also used as a structural component, which is able to absorb tensile and compressive forces at least in the z and x directions. The housing advantageously comprises at least one predetermined breaking point by means of wall thickness reduction or material removal, which minimizes the risk of an injury to the vehicle occupants by electric unit 22, which is typically a display operating element, under high mechanical stress, as in the case of an accident. A damage to the electric units may also be avoided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiving system for receiving at least one guided device in an instrument mount of a motor vehicle, the receiving system comprising:
   a receiving unit to spatially receive the at least one guided device in the receiving system; and
   a guide to implement a guided slide-in movement of the at least one guided device into the receiving unit through a slide-in opening, the guide being fixed in relation to the receiving unit and defining a nonlinear movement path so that the at least one guided device is oriented in a first spatial orientation with respect to an outer surface of the receiving unit that has the slide-in opening and that faces a driver of a motor vehicle equipped with the receiving system during a movement along the guide at the beginning of the slide-in movement, and after the slide-in movement is executed, when the at least one guided device is in a position at a distance from the outer surface of the receiving unit, the at least one guided device is oriented in the receiving unit in a second spatial orientation that is different from the first spatial orientation,
   wherein the guide comprises two essentially linearly running guide sections arranged at an angle in relation to each other, a first one of the two guide sections being positioned upstream of a second one of the two guide sections with respect to an insertion direction of the at least one guided device into the receiving unit through the slide-in opening provided in the outer surface of the receiving unit, such that the second one of the two guide sections forms an end of the nonlinear movement path of the at least one guided device during insertion of the at least one guided device into the receiving unit, and
   wherein the first one of the guide sections extends perpendicular to the outer surface of the receiving unit and the second one of the guide sections is angled with respect to the first one of the guide sections, such that the at least one guided device is inclined with respect to the first one of the guide sections when the at least one guided device is in the second spatial orientation, the second spatial orientation occurring when the at least one guided device is fully inserted into the receiving unit.

2. The receiving system according to claim 1, wherein the guide is configured to implement a guided slide-in movement essentially in a plane substantially perpendicular to the outer surface of the receiving system.

3. The receiving system according to claim 1, further comprising a support structure, the receiving unit being mechanically fixedly connectable or connected to the support structure.

4. The receiving system according to claim 1, wherein the guide comprises a rail and at least one roll on each of two opposite sides of the at least one guided device, the at least one roll being designed to roll on the rail and, as a result, to permit a mechanically guided movement of the at least one guided device along the nonlinear movement path.

5. The receiving system according to claim 1, wherein a shaft formed by the receiving system has a push-through opening on a side facing away from the outer surface of the receiving system for the arranging of the at least one guided device in areas outside a space delimited by the shaft.

6. An electric module comprising the receiving system according to claim 1, and the at least one guided device which is an electric unit arranged in the receiving unit.

7. The electric module according to claim 6, wherein the at least one guided device is fixed in the receiving unit by an engagement.

8. The electric module according to claim 6, wherein at least one second electric unit is arranged at or in the receiving system such that one side of the at least one second electric unit is essentially arranged in the plane of the outer surface of the receiving system.

9. A motor vehicle comprising the receiving system according to claim 1.

10. A motor vehicle comprising the electric module according to claim 6.

11. The receiving system according to claim 1, wherein the at least one guided device is an electric unit and the motor vehicle is a passenger car.

* * * * *